(12) United States Patent
Philavong

(10) Patent No.: US 12,344,083 B2
(45) Date of Patent: Jul. 1, 2025

(54) TARPAULIN BRACKET SYSTEM

(71) Applicant: Precision Tarp Inc., Elgin, IL (US)

(72) Inventor: Johnny Philavong, Elgin, IL (US)

(73) Assignee: Precision Tarp, Inc., Elgin, IL (US)

( * ) Notice: Subject to any disclaimer, the term of this patent is extended or adjusted under 35 U.S.C. 154(b) by 0 days.

(21) Appl. No.: 17/817,556

(22) Filed: Aug. 4, 2022

(65) Prior Publication Data

US 2024/0042839 A1 Feb. 8, 2024

(51) Int. Cl.
*B60J 7/10* (2006.01)
*F16L 23/028* (2006.01)

(52) U.S. Cl.
CPC ............ *B60J 7/104* (2013.01); *F16L 23/028* (2013.01)

(58) Field of Classification Search
CPC ... B60J 7/104; B60J 7/062; B60J 7/064; B60J 7/065
See application file for complete search history.

(56) References Cited

U.S. PATENT DOCUMENTS

| | | | | |
|---|---|---|---|---|
| 5,253,914 A * | 10/1993 | Biancale | .................. | B60J 7/062 296/105 |
| 6,981,734 B2 * | 1/2006 | Martin | ..................... | B60J 7/062 296/100.18 |
| 7,367,606 B2 * | 5/2008 | Ellis | ......................... | B60J 7/062 296/100.11 |
| 8,424,951 B1 * | 4/2013 | Martin | ..................... | B60J 7/062 296/118 |
| 8,579,353 B1 * | 11/2013 | Aulick | ..................... | B60J 7/062 296/100.18 |
| 8,702,151 B2 * | 4/2014 | Mayfield | ................... | B60P 7/04 296/100.18 |
| 9,522,705 B1 * | 12/2016 | McWilliams | .......... | B60J 7/1234 |
| 10,363,800 B2 * | 7/2019 | Philavong | ................ | B60J 7/062 |
| 2014/0373318 A1 * | 12/2014 | Wilson | ...................... | F16B 2/10 24/514 |
| 2016/0107515 A1 * | 4/2016 | Shi | .......................... | B60J 7/062 296/100.18 |

* cited by examiner

*Primary Examiner* — Monica E Millner
(74) *Attorney, Agent, or Firm* — Bishop & Diehl, Ltd.

(57) ABSTRACT

A tarpaulin system for an open cargo hold. The tarpaulin system includes a tarpaulin, a plurality of bows, a plurality of connectors, a cable, and a tail end system. The plurality of connectors connects the plurality of bows to the cable while the tarpaulin is draped atop the plurality of bows. The tarpaulin bracket system allows for quick, and easy, replacement, or fixing, of the plurality of connectors or damaged bows allowing for much easier and efficient replacement while traveling in harsh environments.

10 Claims, 8 Drawing Sheets

TARPAULIN BRACKET SYSTEM

TECHNICAL FIELD OF THE INVENTION

The present invention relates to a tarpaulin (aka, tarp) system for an open cargo hold of a vehicle. Particularly, the application relates to a tarpaulin bracket system for mounting to a vehicle to provide a structure for attachment of a tarp. Unique components of, as well as methods and devices for creating such a tarpaulin bracket system are also described.

BACKGROUND OF THE INVENTION

In the past, trucks often carried loose cargo within open-top trailers. The cargo was often damaged due to weather conditions or portions lost during transit. Further, the hazard created by loose items flying out of an open-top of cargo trailers has led many governing bodies to enact strict laws against such open transport. As a result, transporters started covering the cargo area of truck trailers to protect the goods from rain and minimize, if not eliminate the risk of items flying out of the truck trailer.

The traditional method of covering the cargo was with a tarpaulin. Initially, the tarpaulin was stretched across the open top and attached at the trailer sides. This was effective, but had many drawbacks related to slow attachment/detachment time and the undesirability of a sagging tarp onto certain goods being transported—e.g., hot asphalt. Later, a series of bows was brought into use to keep the tarpaulin from lying in direct contact with goods in the truck trailer and to prevent water accumulation.

Currently, as used in the industry, a tarpaulin is positioned to hang across a series of spaced apart bows which span the open top of a trailer and are connected to a motorized cable system. The motorized cable system is used to move the tarpaulin, via the bows, forward and backward across the cargo hold of the trailer. Each side of the bows is connected to the motorized cable using brackets.

Referring to FIG. 1, a prior art bracket 100 is shown. The bracket 100 includes a closed cylindrical channel 102 through which a cable is threaded. The system of this prior art bracket works well until any of the bows break—which is not uncommon in the industry. Then, the entire tarpaulin system must be dismantled so the broken bow(s) can be fixed or replaced. This job is tedious and can take a long time to complete.

FIG. 2 illustrates an improved prior art bracket 110. This two-piece bracket 110 creates a channel 112 between a curved top side 114 and a flat bottom side 116 which come together around a tarpaulin cable. In the event of a broken bow, the two-piece bracket 110 can be uncoupled from the cable without removing any other brackets. However, this bracket 110 has a tendency to lock up the cable due to the angle of the curved side 114 relative to the flat side 116. This locking problem makes manual or automatic cranking of the tarpaulin difficult and often requires intervention by a worker to get the tarpaulin to be smoothly drawn across the open trailer bed.

Additionally, the motorized system doesn't always extend far enough to cover the entire open-top cargo hold. Even a small open area can present a danger when loose items (e.g., dirt, gravel, wood) are being transported in high-traffic areas.

Accordingly, there is a need in the art for an improved bracket system for quickly and effectively connecting a tarpaulin to a truck trailer and for an improved method of creating such a tarpaulin system.

These and other problems are addressed by the present system and its components to provide a unique structure with numerous advantages in operation and effectiveness.

SUMMARY OF THE INVENTION

There is disclosed herein a tarpaulin bracket and bracket system for attachment to an open cargo hold for a vehicle, which avoid the disadvantages of prior tarpaulin systems and components while affording additional and structural operating advantages.

Generally speaking, the tarpaulin bracket system is comprised of a cable system, a plurality of bows for supporting a tarpaulin, and a plurality of connectors. The cable system comprises right and left first end pulleys, right and left second end pulleys, a first cable connecting the right first end pulley to a right second end pulley, a second cable connecting the left first end pulley to the left second end pulley, and a drive for moving the right and left first end pulleys simultaneously and having an aperture in each of two opposing ends. The plurality of connectors is detachably connected to one of either the first and second cables and to each end of every bow. Each connector comprises a first plate member, a second plate member and a fastener.

In a specific embodiment, the first plate member has a planar surface with an aperture, two opposing upturned substantially parallel sidewalls along at least a portion of opposing sides of the planar surface so as to define a channel, and a semi-tube-shaped flange portion extending from an end of the planar surface positioned between the upturned sidewalls. The second plate member has a planar surface with an aperture therein and a complimentary semi-tube-shaped flange portion extending from the planar surface along an end. The fastener connects the first and second plate members to a bow, wherein the apertures in the respective planar surfaces of the first and second plate members align with one another and an aperture in an end of a bow to allow the fastener to pass through the three aligned apertures so as to sandwich the end of the bow between the first and second plate members in a manner such that the semi-tube-shaped flanges of the two plate members substantially abut so as to form a tube and attach the connector to one of either the first cable or the second cable positioned between the two flanges.

These and other aspects of the invention may be understood more readily from the following description and the appended drawings.

BRIEF DESCRIPTION OF THE DRAWINGS

For the purpose of facilitating an understanding of the subject matter sought to be protected, there are illustrated in the accompanying drawings, embodiments thereof, from an inspection of which, when considered in connection with the following description, the subject matter sought to be protected, its construction and operation, and many of its advantages should be readily understood and appreciated.

DETAILED DESCRIPTION OF THE INVENTION

Figure 1:
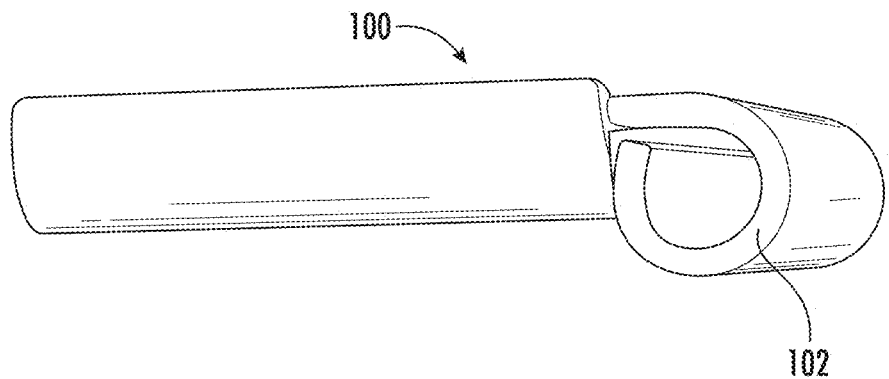
FIG. 1 is a perspective view of a prior art tarpaulin bracket.
Figure 2:
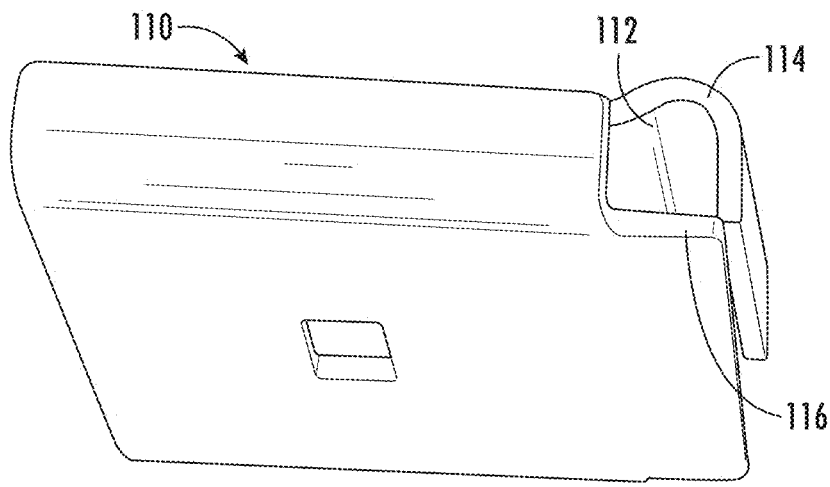
FIG. 2 is a side view of another prior art tarpaulin bracket.
Figure 3:
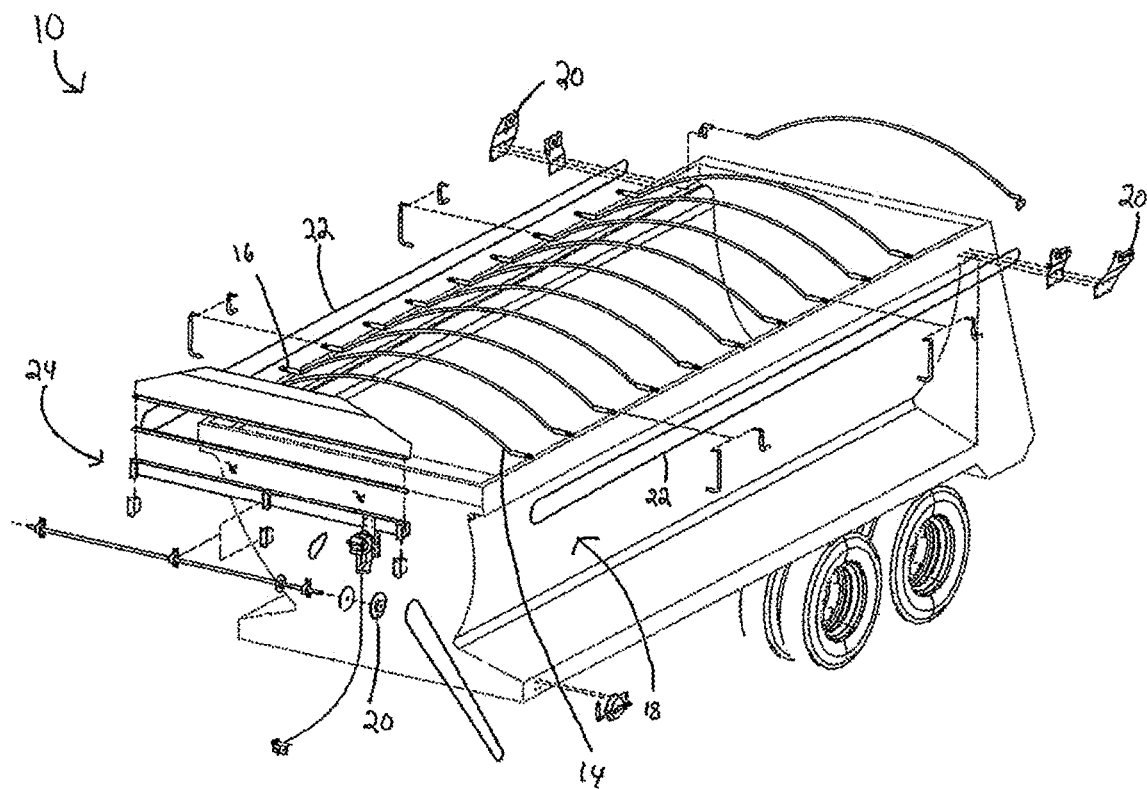
FIG. 3 is an exploded view of an embodiment of a tarpaulin bracket system in accordance with the present disclosure.

While this invention is susceptible of embodiments in many different forms, there is shown in the drawings and will herein be described in detail at least one preferred embodiment of the invention with the understanding that the present disclosure is to be considered as an exemplification of the principles of the invention and is not intended to limit the broad aspect of the invention to any of the specific embodiments illustrated.

Referring now to FIGS. 3-9, there is illustrated an exemplary embodiment of the tarpaulin bracket system 10 and its components. The tarpaulin bracket system 10 is comprised of a tarpaulin 12, a plurality of bows 14, a plurality of connectors 16, and a cable system 18 with pulleys 20 and cables 22. Preferably, most of these components are made of strong materials to withstand the conditions of being atop an open cargo area of a vehicle during transportation of goods. U.S. Pat. No. 10,363,800 to Philavong and assigned to Precision Tarp Inc. of Elgin, IL is hereby incorporated by reference.

The system 10 begins with the cable system 18 attached at the front of the open cargo area (see U.S. Pat. No. 6,981,734, which is hereby incorporated by reference). A first set of left and right pulleys 20 are attached at the front with a second set of left and right pulleys 20 attached at the rear of the cargo hold. A drive mechanism 24 is also attached at the front of the cargo. The drive mechanism 24 is coupled to the first pair of pulleys to rotate each simultaneously. The drive mechanism 24 may be either manual or power-aided. A cable 22 connects the two right pulleys and a second cable connects the two left pulleys.

Figure 4:
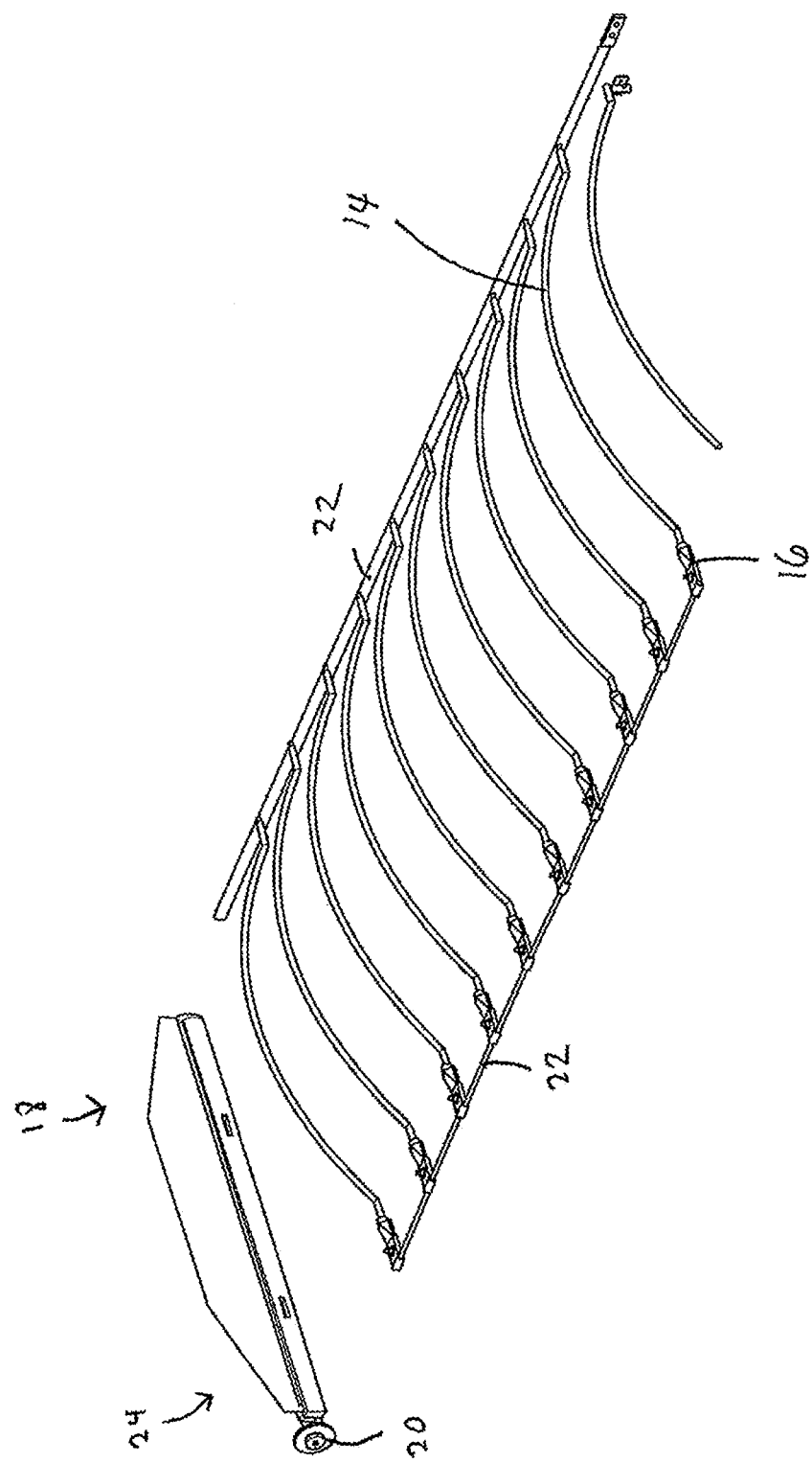
FIG. 4 is a perspective view of an embodiment of a plurality of bows connected to a cable system.
Figure 5:
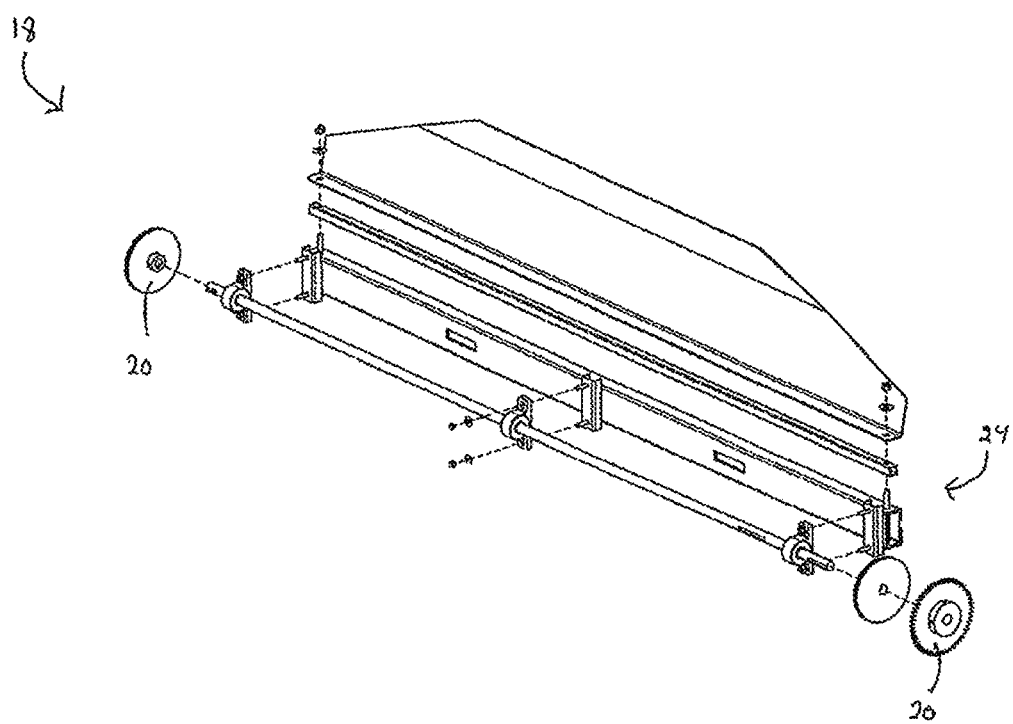
FIG. 5 is a perspective view of an embodiment of the front portion of the cable system.
Figure 9:
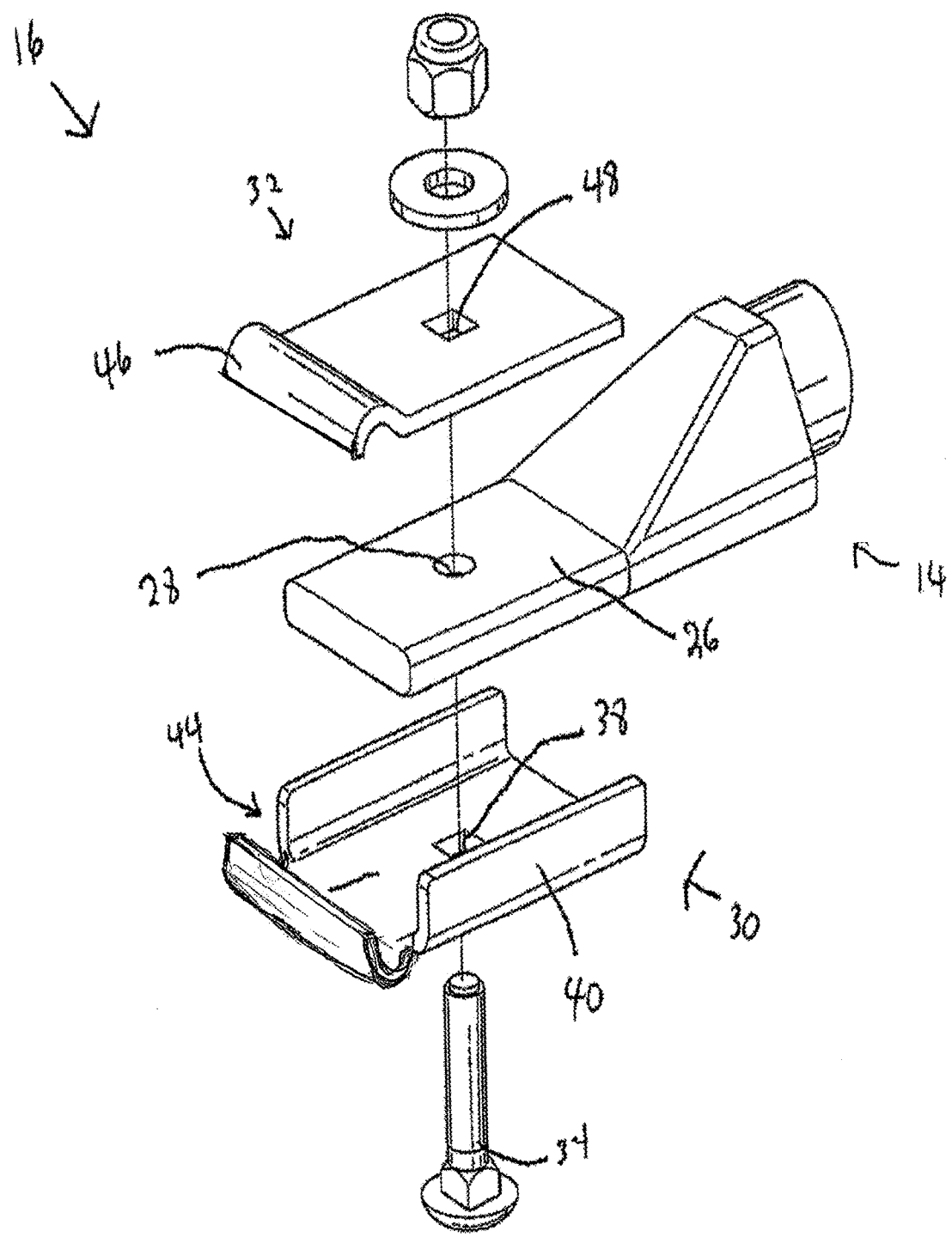
FIG. 9 is an exploded view of the disclosed embodiment of a two-piece tarpaulin bow bracket with the bow end.

Across the open-top of the cargo area, a plurality of bows 14 is arranged, as shown in FIG. 4. The opposing ends on each bow include a substantially flat portion 26 with an aperture 28. On each end of each bow 14 a connector 16 is attached, as shown in FIG. 9.

Figure 6:
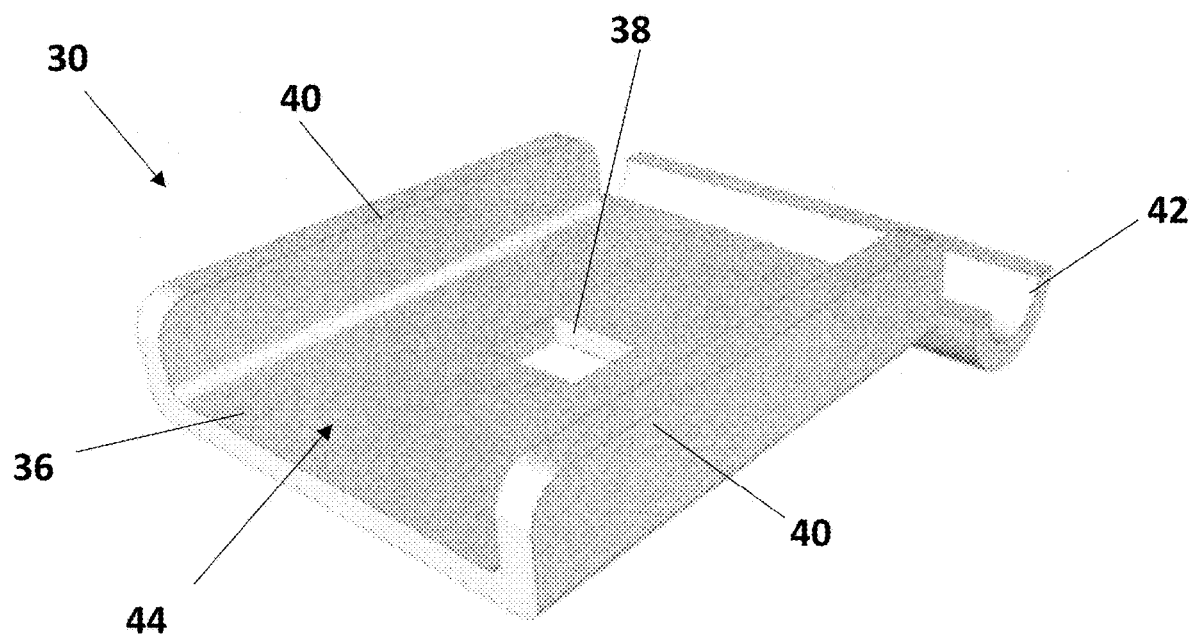
FIG. 6 is a perspective view of a first plate used in an embodiment of the two-piece connector.

The connector 16 is comprised of a first plate 30, a second plate 32, and a fastener 34. The first plate 30 has a planar surface 36 with an aperture 38, two opposing upturned sidewalls along at least a portion of opposing sides of the planar surface 36, and a curved flange portion 42 extending from an end of the planar surface 36. The curved flange portion 42 is most preferably semi-cylindrical, as shown in FIG. 6. A channel 44 is formed by the sidewalls 40 to allow the substantially flat portion 26 of the bow end to slide into engagement with the first plate 30.

Figure 7:
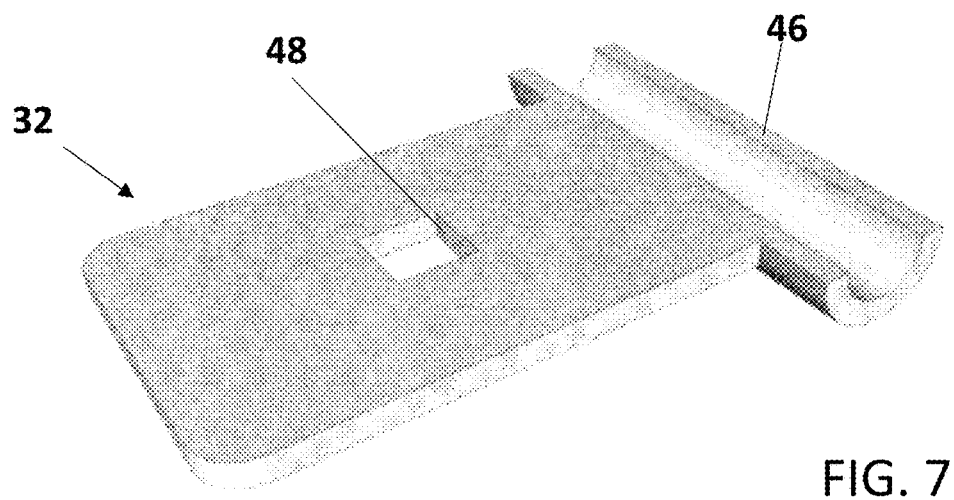
FIG. 7 is a perspective view of a second plate used in an embodiment of the two-piece connector.
Figure 8A:
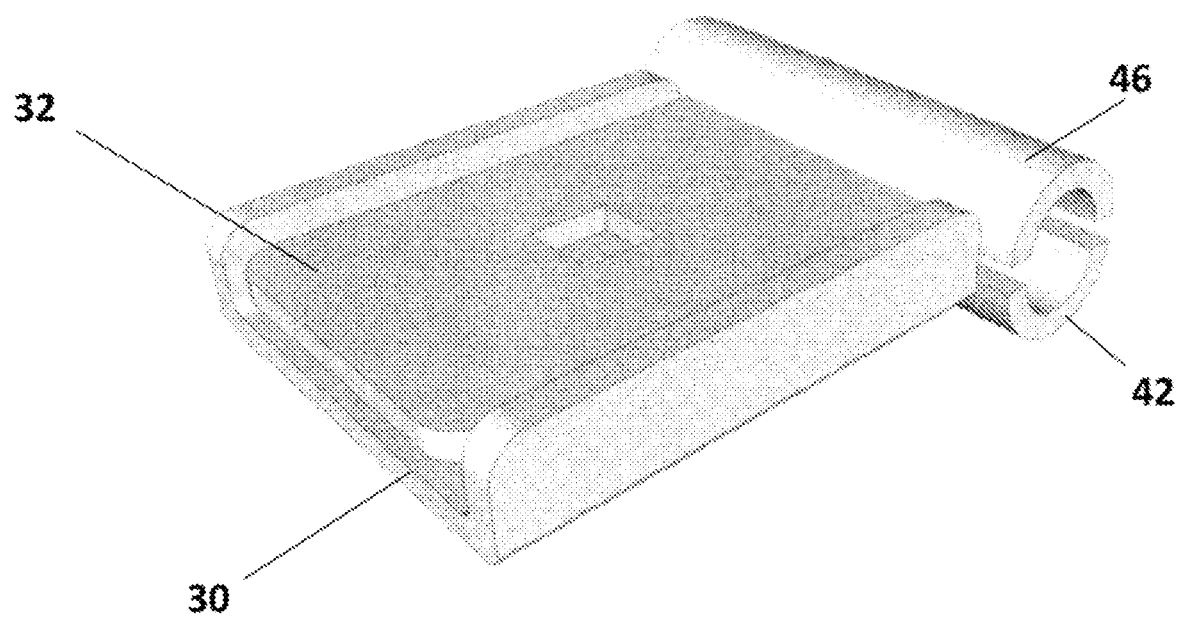
FIG. 8A is a perspective view of the two plates of FIGS. 6 and 7 as they would be aligned in use to form a tarpaulin bracket.
Figure 8B:
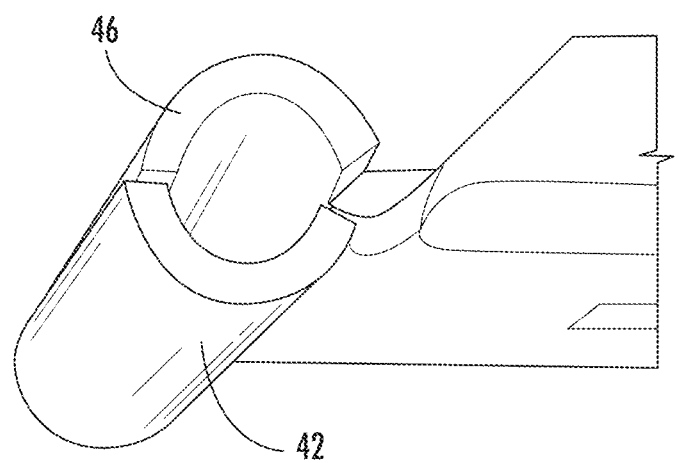
FIG. 8B is a side view of the bracket of FIG. 8A.

The second plate 32, having a second curved flange portion 46 and aperture 48, is placed above the flat portion 26 to thereby sandwich the bow end in cooperation with the first plate 30, as shown in FIG. 6. The apertures 48, 28, 38 align to allow the fastener 34 to be inserted and secured. Like the first plate 30, the second curved flange portion 46 of the second plate 32 is most preferably semi-cylindrical, as shown in FIG. 7. The two curved flanged portions, 42 and 46, complement one another to form a cylindrical passage when the apertures 38, 48 are aligned, as shown in FIGS. 8A and 8B.

Before tightly securing the fastener 34, the first curved flange portion 42 and the second curved flange 46 align to form the cylindrical passage which secures about one of either the first or second cable 22. Once the fastener 34 is properly tightened, the connector 16 secures the bow to the cable 22. This is repeated for the other end of the bow 14 until all bows are properly spaced and secured to the first and second cables 22 of the cable system 18.

Finally, a tarpaulin 12 can be attached to the bows 14 in a usual manner. As the cable system 18 is operated, the cables 22 move about the pulleys 20. The connectors 16 are also moved, thereby moving the attached tarpaulin 12.

In the event any bows 14 becomes damaged, as often happens, the connectors 16 on each end of the damaged bow 14 can be easily removed by removing the fastener 34. A new bow 14 can then be inserted and reattached to the connectors 16 and the cable 22.

The tarpaulin 12 is preferably made of water-resistant material such as polyethylene, treated canvas, vinyl, or similar material. The cables 22 are preferably braided and made of a strong metal material. The plurality of connectors 16 are preferably made of a strong pressed metal. The plurality of bows 14 are preferably made from a variety of metal materials welded to allow the plurality of bows to have the necessary strength to withstand being atop the open cargo vehicle.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A connector for attaching a bow to a cable assembly in a movable tarpaulin system, the connector comprising:
    a first plate member having a planar surface with an aperture, two opposing upturned sidewalls along at least a portion of opposing sides of the planar surface so as to define a channel, and a first curved flange portion extending in a curve from an end of the planar surface positioned between the upturned sidewalls;
    a second plate member having a planar surface with an aperture therein and a second curved flange portion extending in a curve from the planar surface along an end;
    a fastener for connecting the first and second plate members to a bow;
    wherein the apertures in the respective planar surfaces of the first and second plate members align with one another and an aperture in an end of a bow to allow the fastener to pass through the three aligned apertures so as to sandwich the end of the bow between the first and second plate members, and
    wherein when the apertures are aligned, the first curved flange portion of the first plate member and the second curved flange portion of the second plate member form a cylindrical passage.

2. The connector of claim 1, wherein the channel is configured to fit about the end of the bow to prevent movement about the fastener through the aperture.

3. The connector of claim 2, wherein the planar surface of the second plate member sits within the channel when fastened to the bow and first plate member.

4. The connector of claim 1, wherein the fastener is adjustable so as to permit attachment to and detachment from the cable positioned between the two curved flange portions.

5. A tarpaulin bracket system for attachment to an open cargo hold for a vehicle, the tarpaulin bracket system comprising:
- a cable system comprising a right and left first end pulleys, right and left second end pulleys, a first cable connecting the right first end pulley to a right second end pulley, a second cable connecting the left first end pulley to the left second end pulley, and a drive for moving the right and left first end pulleys simultaneously;
- a plurality of bows for supporting a tarpaulin and having an aperture in each of two opposing ends;
- a plurality of connectors, wherein a first end of each bow is detachably connected to the first cable by a connector and a second end of each bow is detachably connected to the second cable by a connector;
- wherein each connector comprises:
  - a first plate member having a planar surface with an aperture, two opposing upturned sidewalls along at least a portion of opposing sides of the planar surface so as to define a channel, and a first curved flange portion extending in a curve from an end of the planar surface positioned between the upturned sidewalls;
  - a second plate member having a planar surface with an aperture therein and a second curved flange portion extending in a curve from the planar surface along an end;
  - a fastener for connecting the first and second plate members to a bow from the plurality of bows;
- wherein the apertures in the respective planar surfaces of the first and second plate members align with one another and an aperture in an end of a bow from the plurality of bows to allow the fastener to pass through the three aligned apertures so as to sandwich the end of the bow between the first and second plate members, and
- wherein the first curved flange portion of the first plate member and the second curved flange portion of the second plate member form a cylindrical passage through which one of either the first cable or the second cable is positioned during use.

6. The tarpaulin bracket system of claim 5, wherein the plurality of connectors are individually removable from connection to the cable.

7. The tarpaulin bracket system of claim 5, wherein the plurality of connectors are individually removable from attachment to each of the plurality of bows.

8. The tarpaulin bracket system of claim 5, further comprising a tarpaulin detachably connected to each of the plurality of bows and movable from an open state to a closed state by operation of the cable system.

9. The tarpaulin bracket system of claim 8, further comprising a fixed bow positioned proximate the second end pulleys.

10. The tarpaulin bracket system of claim 9, wherein the fixed bow is positioned within a truck cargo hold below the cable system so as to be overlapped by at least one of the plurality of bows when in a closed state.

* * * * *